Feb. 8, 1927. 1,617,143
A. BARBIER
SHUTTLE BOX MOTION OF LOOMS
Filed March 18, 1925 3 Sheets-Sheet 1

Inventor
A. Barbier:
by
W. E. Evans
Attorney.

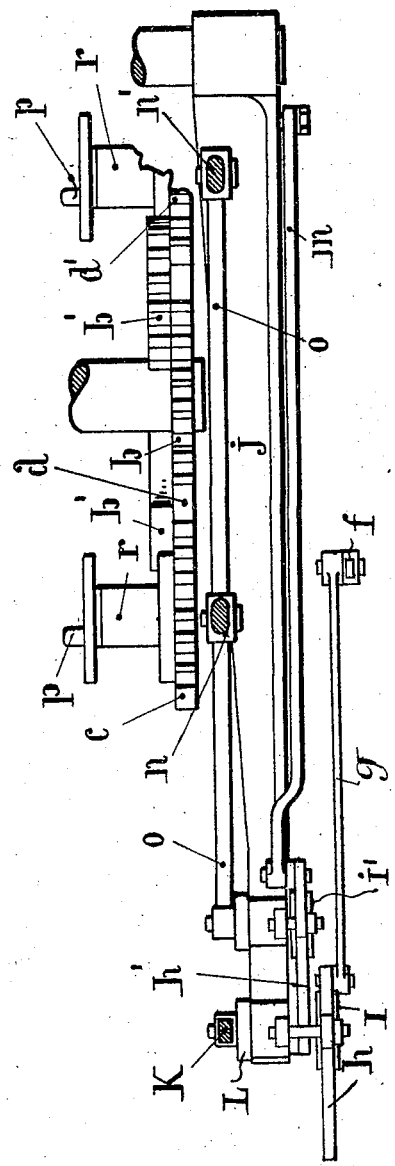

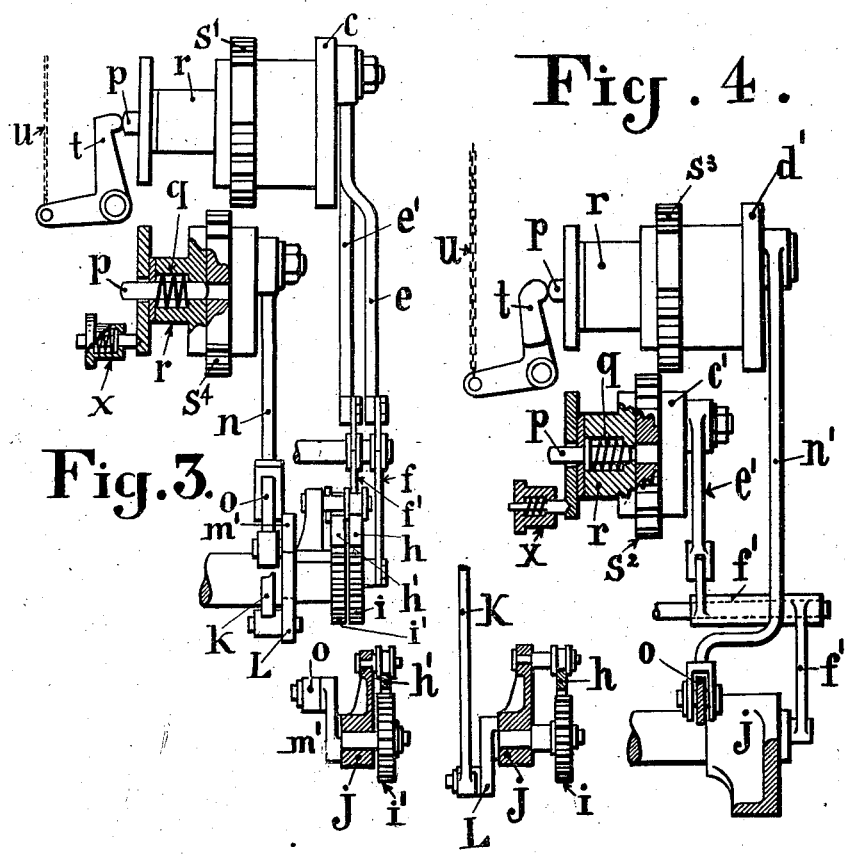
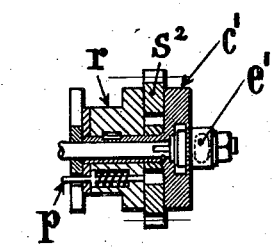

Patented Feb. 8, 1927.

1,617,143

UNITED STATES PATENT OFFICE.

ALEXANDRE BARBIER, OF LYON, FRANCE.

SHUTTLE-BOX MOTION OF LOOMS.

Application filed March 18, 1925, Serial No. 16,459, and in France December 5, 1924.

This invention relates to mechanism for the control of shuttle boxes of weaving looms.

According to the invention a plate or disc fixed upon a rotatable shaft carries toothed sectors disposed in a medial plane common to their adjacent faces, and effecting a half rotation of four satellite pinions disposed two and two in different planes at each passage of the toothed sectors in engagement with the respective pinions. Two of these pinions together control, through a lever, the movement of the boxes to an extent of four boxes or less. The third pinion actuates by means of a rod and a bell crank lever, a horizontal toothed rack causing a semi-rotation of a pinion carried by a main lever whereby a crank, by which the lever operated by the two first pinions is connected to the main lever, is rotated and the main lever actuating the control rod of the boxes is caused to rise or fall to an extent of four boxes. The fourth pinion produces the same movement as the third pinion, but it actuates a toothed rack which causes a semi-rotation of a pinion carried at the extremity of the main lever whereby a crank, to which the control rod of the boxes is connected, is rotated to effect the rise or fall of the boxes to an extent of four boxes.

Thus any one of a number of boxes, from one to twelve may be positively moved into the operative position, the third and fourth satellite pinions each causing the rise or fall of the boxes to an extent of four boxes and the positioning of the intermediate boxes being always obtained as hereinafter described by the two first satellite pinions referred to.

In the accompanying drawing is represented by way of example mechanism according to the invention.

In the drawing,

Figure 2 is a corresponding plan view from below, part of the elements being removed to show the disposition of the levers in plan.

Figure 3 is an end view corresponding to Figure 1.

Figure 4 is a section on the line G—H Figure 1.

Figure 5 is a section on the line A—B Figure 1.

Figure 6 is a section on the line C—D Figure 1.

Figure 7 is a section on the line E—F Figure 1.

Figure 1:
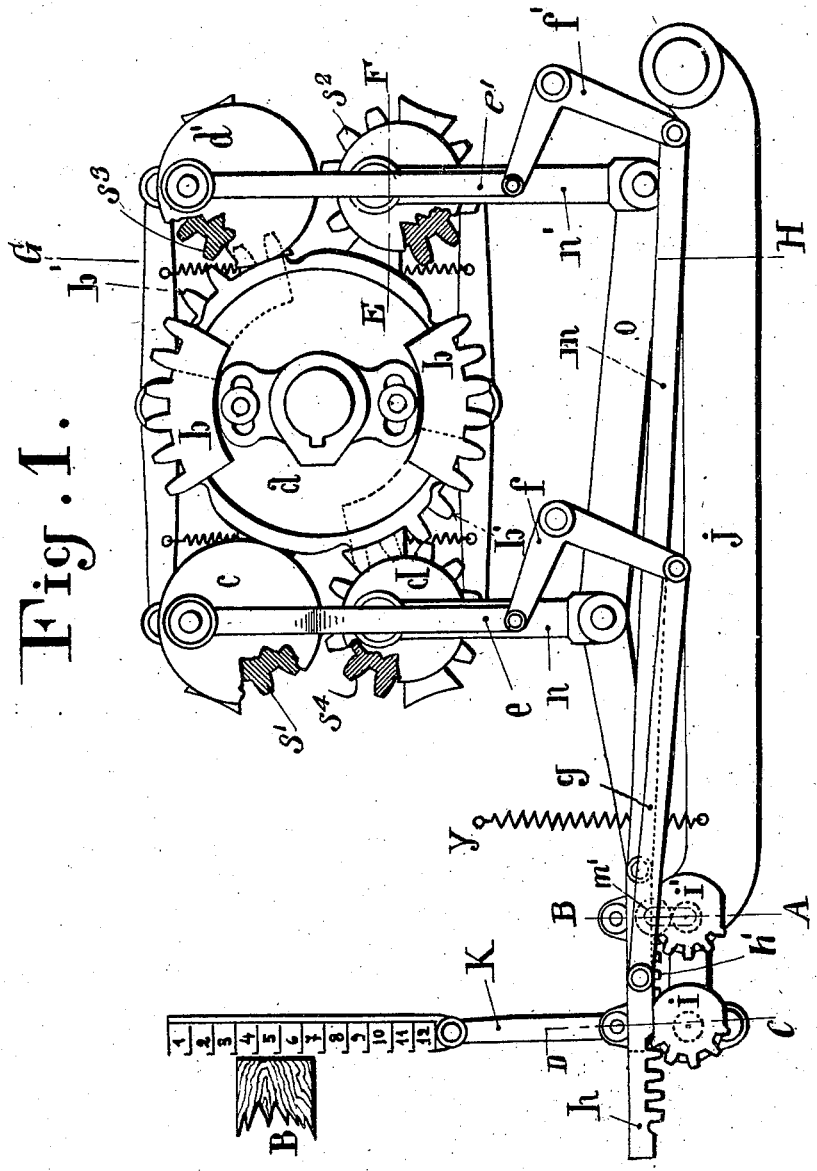
Figure 1 is a part sectional side elevation of the mechanism.

The plate $a$ or disc mounted fixedly upon a rotatable shaft carries toothed sectors $b$, $b$ and $b^1$, $b^1$. The rear faces of the sectors $b$, $b$ are disposed in the same plane as the front faces of the sectors $b^1$, $b^1$. The sectors $b$, $b$ are in the same plane as the pinions $S^3$ and $S^4$ which are turned through half a revolution at each passage of the respective toothed sectors $b$, $b$. The sectors $b^1$, $b^1$ are in the same plane as the pinions $S^1$ and $S^2$ which are actuated in the same manner as the pinions $S^3$, $S^4$. Discs $c$, $c^1$ and $d$, $d^1$ are mounted coaxially with the respective satellite pinions $S^1$, $S^2$ and $S^3$, $S^4$ and are clutched thereto by means of the card mechanism as hereinafter described. The rod $e^1$ pivoted to the disc $c^1$, is connected by means of a bell crank lever $f^1$ to a rod $m$ which is articulated to a toothed rack $h^1$. The rack $h^1$ is in engagement with a pinion $i^1$ rotatably mounted upon the main control rod actuating lever $j$. The control rod of the boxes is represented at K.

In the accompanying drawing the third box is in the position of use and the batten is indicated at B, it being understood that the boxes are mounted in any suitable manner permitting their vertical reciprocation.

The rod $e$ pivoted to the disc $c$ is connected by a bell crank lever $f$ to a rod $g$ which is articulated to a toothed rack $h$. The rack $h$ is in engagement with the pinion $i$. The two rods $n$ and $n^1$ pivoted to the discs $d$ and $d^1$ respectively are articulated to a lever $o$. The pinions $S^1$, $S^2$ and $S^3$, $S^4$ corresponding to the discs $c$, $c^1$ and $d^1$, $d$ turn freely upon the respective axes of the discs to which latter they are capable of being clutched by means each constituted of a pin $p$ and a spring $q$ disposed in a concentric casing $r$.

Bell crank levers $t$ are connected by cables $u$ to the card mechanism of the loom and on being actuated by the card mechanism apply pressure upon the pins $p$, which are thus pushed into one of two holes in the respective pinions which are thus fixed to the respective discs during the half rotation of the pinions by the toothed sectors $b$, $b$, and $b^1$, $b^1$. The bell crank levers are provided in pairs, each pair being symmetrically disposed on a horizontal axis and at each side of the axis of the respective pinion so that the pin $p$ may be engaged in either of two positions.

Each disc $c$, $c^1$, $d$, $d^1$ is provided with a device comprising a spring pressed pin engaging with a plate or the like fixedly secured to the respective disc, the device acting as a brake and tending to cause relative movement of the disc and the respective pinion during their half rotation whereby the respective pin $p$ is subjected to a slight shearing action and is maintained within the hole in the pinion until the half rotation is completed, whereupon the pin $p$ is withdrawn by its spring. Recesses may be provided in the plate within which a spring pressed pin may engage as shown at $x$ to maintain the disc in the position to which it has been rotated by the respective pinion.

A spring is connected between a fixed point $y$ and the main lever $j$ for balancing the weight of the boxes and the associated parts.

The operation of the mechanism hereinbefore described is as follows:

The plate $a$ or disc carrying the toothed sectors $b$, $b$ and $b^1$, $b^1$ is rotated. When the card mechanism causes the engagement of the respective pin $p$ with the pinion $S^3$ the pinion in its half rotation carries with it the disc $d^1$. The rod $e^1$ by means of the bell crank lever $f^1$ actuates the rod $m$, causing the toothed rack $h^1$ to effect a semi-rotation of the pinion $i^1$. The pinion $i^1$ is fixedly mounted upon a spindle pivoted on the lever $j$ and carrying a crank $m^1$ to the outer end of which the end of the lever $o$ is pivotally connected. Thus, the lever $o$ being suspended from the discs $d$ and $c^1$ by means of the rods $n$, $n^1$ so as to be capable of swinging longitudinally whereby, when the discs $d$ and $c^1$ are held stationary, the point at which the lever $o$ is pivotally connected to the crank $m^1$ is maintained substantially in the same horizontal plane on limited longitudinal movement of the lever $o$, the movement of the crank $m^1$ by the operation of the disc $d^1$, through the rod $e^1$, the bell crank lever $f^1$, rod $m$, rack $h^1$, and pinion $i^1$ causes the axis of the crank and consequently the lever $j$ to rise or to fall to an extent of four boxes.

When the card mechanism causes the respective pin $p$ to engage with the pinion $S^1$ the pinion in its half rotation carries with it the disc $c$. The rod $e$, by means of the bell crank lever $f$, imparts a movement of translation to the lever $g$, and the toothed rack $h$ causes a semi-rotation of the pinion $i$ which rotation is communicated to a crank $L$ to the outer extremity of which the control rod of the boxes is pivoted and causes the rise or fall of the boxes to an extent of four boxes.

When the card mechanism causes the engagement of the respective pin $p$ with the pinion $S^4$ the pinion in its half rotation carries with it the disc $d$. The corresponding rod $n$ actuates the lever $o$ connected to the lever $g$ by the crank $m^1$ and causes the main lever $j$ to rise or fall to an extent of two boxes.

When the card mechanism causes the engagement of the respective pin $p$ with the pinion $S^2$, the pinion in its half rotation carries with it the disc $c^1$. The corresponding rod $n^1$ actuates the lever $o$ connected to the main lever $j$ by means of the crank $m^1$ and causes the main lever $j$ to rise or fall to an extent of one box.

When the boxes are in their lowest position the parts are as shown in the drawing except that the disc $d$ has been rotated to lower the rod $n$, the lever $o$ and the main lever $j$ to an extent equivalent to two boxes. Thus the four discs $c$, $c^1$ and $d$, $d^1$ are in the "zero" position, and the first box is in position.

In order to bring the second box into the operative position the disc $c^1$ is clutched to the pinion $S^2$ as hereinbefore described while the pinion turns through half a revolution whereby the lever $o$ is moved to an extent sufficient to raise the main lever $j$ to the extent of one box.

To bring the third box into position, the disc $d$ is actuated to lift the lever $o$ to cause a rise of two boxes and the disc $c^1$ is returned to the "zero" position.

To bring the fourth box into position, the disc $d$ is maintained in the position corresponding to the third box and the disc $c^1$ is actuated to move the lever $o$ and to raise the main lever $j$ to the extent of one box.

To bring the fifth box into position, the disc $c$ or $d^1$ is actuated as hereinbefore described to cause the rise of four boxes and the discs $d$ and $c^1$ are moved to the positions corresponding to the first box, that is to their "zero" positions.

For the sixth, seventh and eighth boxes the disc $c$ or $d^1$ remains stationary and the discs $d$ and $c^1$ are moved into the positions corresponding to the second, third, and fourth boxes.

To bring the ninth box into position both the discs $c$ and $d^1$ are actuated to cause the total rise of eight boxes and the discs $d$ and $c^1$ are moved into the positions corresponding to the first box, that is into their "zero" positions. While to bring the tenth, eleventh and twelfth boxes into position the discs $d$ and $c^1$ are moved into the positions corresponding to the second, third and fourth boxes.

By such means the movement of any one of the twelve boxes into the operative position is positively effected and is a direct result of actuation by the card mechanism of the loom.

I claim—

1. A shuttle box motion for weaving looms comprising a rotatable element, four satellite pinions disposed diagonally in pairs in different planes around said rotatable element, toothed sectors upon said rotatable element adapted to engage with said satellite pinions to effect a half rotation thereof at each passage of a toothed sector in engagement therewith, mechanism connected to the shuttle boxes to cause their rise and fall, means connecting one of said satellite pinions to said mechanism and adapted to cause vertical movement of said shuttle boxes to an extent corresponding to one box, means connecting another of said satellite pinions to said mechanism and adapted to cause vertical movement of said shuttle boxes to an extent corresponding to two boxes and means connecting each of the two remaining satellite pinions to said mechanism and adapted to cause vertical movement of said shuttle boxes to an extent corresponding to four boxes on the rotation of each of said two remaining satellite pinions, substantially as described.

2. A shuttle box motion for weaving looms comprising a rotatable element, four freely rotatable satellite pinions disposed diagonally in pairs in different planes around said rotatable element, toothed sectors upon said rotatable element adapted to engage with said satellite pinions to effect a half rotation thereof at each passage of a toothed sector in engagement therewith, four rotatable members disposed coaxially with said respective satellite pinions but rotatable with respect thereto, means operated by the card mechanism of the loom adapted to clutch said rotatable members to the respective satellite pinions, mechanism connected to the shuttle boxes adapted to cause their rise and fall, means connecting one of said rotatable members to said mechanism and adapted on the rotation of said rotatable member by said respective satellite pinion to cause vertical movement of said shuttle boxes to an extent corresponding to one box, means connecting another of said rotatable members to said mechanism and adapted to cause vertical movement of said shuttle boxes to an extent corresponding to two boxes and means connecting each of the two remaining rotatable members to said mechanism and adapted to cause the vertical movement of the said shuttle boxes to an extent corresponding to four boxes on the rotation of each of said two remaining rotatable members by the respective pinions, substantially as described.

3. A shuttle box motion for weaving looms comprising a rotatable element, four freely rotatable satellite pinions disposed diagonally in pairs in different planes around said rotatable element, toothed sectors upon said rotatable element adapted to engage with said satellite pinions to effect a half rotation thereof at each passage of a toothed sector in engagement therewith, four rotatable members disposed co-axially with said respective satellite pinions but rotatable with respect thereto, means operated by the card mechanism of the loom adapted to clutch said rotatable members to the respective pinions, a substantially horizontally disposed lever pivotally mounted at one end and connected at the other end to the shuttle boxes, means connecting one of said rotatable members to said lever and adapted on the rotation of said rotatable member by said respective satellite pinion to cause vertical movement of said shuttle boxes to an extent corresponding to one box, means connecting another of said rotatable members to said mechanism and adapted to cause vertical movement of said shuttle boxes to an extent corresponding to two boxes, mechanism upon said lever adapted for actuation by the two remaining rotatable members, means connecting each of said two remaining rotatable members to said mechanism and adapted to cause the vertical movement of said shuttle boxes on the rotation of each of said two remaining rotatable members by the respective satellite pinions to an extent corresponding to four boxes, substantially as described.

4. A shuttle box motion for weaving looms comprising a rotatable element, four freely rotatable satellite pinions disposed diagonally in pairs in different planes around said rotatable element, toothed sectors upon said rotatable element adapted to engage with said satellite pinions to effect a half rotation thereof at each passage of a toothed sector in engagement therewith, four rotatable members disposed co-axially with said respective satellite pinions but rotatable with respect thereto, means operated by the card mechanism of the loom adapted to clutch said rotatable members to the respective pinions, a substantially horizontally disposed lever pivotally mounted at one end and connected at the other end to the shuttle boxes, means connecting one of said rotatable members to said lever and adapted on the rotation of said rotatable member by said respective satellite pinion to cause vertical movement of said shuttle boxes to an extent corresponding to one box, means connecting another of said rotatable members to said mechanism and adapted to cause vertical movement of said shuttle boxes to an extent corresponding to two boxes, two toothed pinions rotatably mounted upon said lever, racks adapted to engage with said toothed pinions for their rotation, means connecting the two remaining rotatable members to said racks for their axial movement on rotation of said two remaining rotatable members by said respective satellite pinions, and mechanism adapted to be operated by each of said toothed pinions to cause vertical movement of said shuttle boxes to an extent corresponding to four boxes, substantially as described.

5. A shuttle box motion for weaving looms comprising a rotatable element, four freely rotatable satellite pinions disposed diagonally in pairs in different planes around said rotatable element, toothed sectors upon said rotatable element adapted to engage with said satellite pinions to effect a half rotation thereof at each passage of a toothed sector in engagement therewith, four rotatable members disposed co-axially with said respective satellite pinions but rotatable with respect thereto, a pin slidably mounted in each of said rotatable members and adapted to engage the respective satellite pinion to clutch it to said respective rotatable member, means operated by the card mechanism of the loom to force said pin into engagement with said respective satellite pinion, a spring adapted to disengage said pin from said respective satellite pinion when it has completed a half rotation, a substantially horizontally disposed lever pivotally mounted at one end, a second lever suspended by links from two of said rotatable members, one of which actuates said second lever to cause vertical movement of said shuttle boxes to an extent corresponding to one box, while the other actuates said second lever to cause the vertical movement of said shuttle box to an extent of two boxes, a crank connecting the free ends of said levers together, a toothed pinion connected to said crank and mounted upon the lever first referred to, a rack adapted to engage said toothed pinion, means connecting one of the two remaining rotatable members to said rack for its axial movement on rotation of the respective rotatable member to cause vertical movement of the shuttle boxes to an extent corresponding to four boxes, a second crank mounted at the extremity of the lever first referred to, a rod connecting said crank to said shuttle boxes, a second toothed pinion connected to said crank, a second rack adapted to engage with said second toothed pinion and means connecting the remaining rotatable member to said second rack for its axial movement on rotation of the respective rotatable member to cause vertical movement of said shuttle boxes to an extent corresponding to four boxes, substantially as described.

ALEXANDRE BARBIER.